A. BERTELSEN & M. MARTENS.
Process of Preparing Grain for Grinding.
No. 163,139.    Patented May 11, 1875.
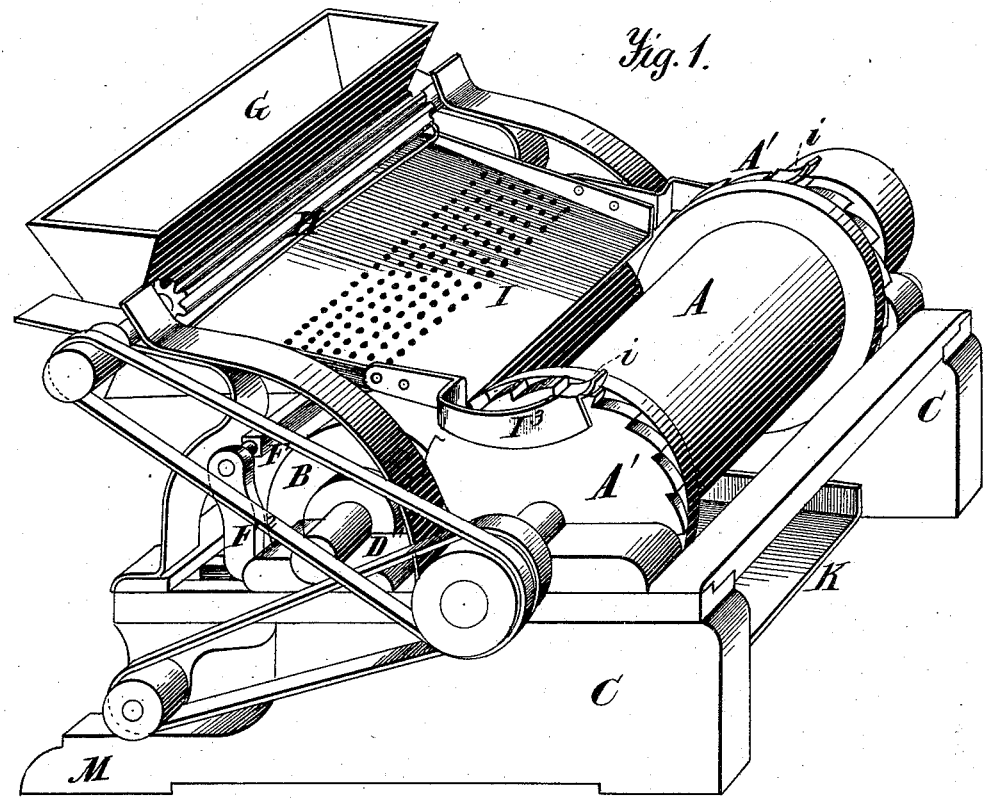
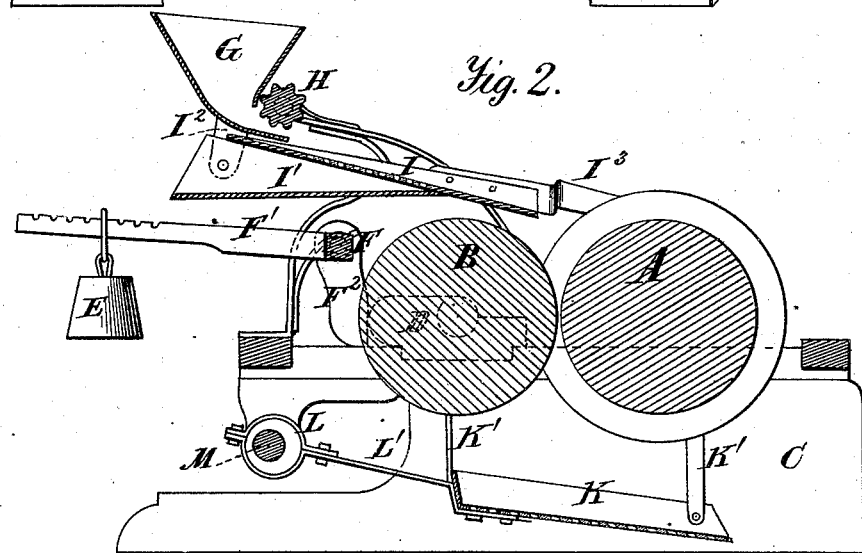
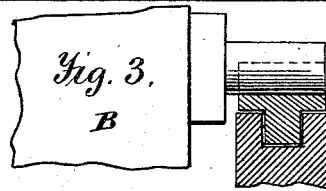

UNITED STATES PATENT OFFICE.

ANDREW BERTELSEN, OF WEST SALEM, AND MARTEN MARTENS, OF WRIGHTSVILLE, WISCONSIN.

IMPROVEMENT IN PROCESSES OF PREPARING GRAIN FOR GRINDING.

Specification forming part of Letters Patent No. 163,139, dated May 11, 1875; application filed December 1, 1874.

*To all whom it may concern:*

Be it known that we, ANDREW BERTELSEN, of West Salem, in the county of La Crosse and State of Wisconsin, and MARTEN MARTENS, of Wrightsville, in the county of Jackson and State of Wisconsin, have invented an Improvement in the Art of Preparing Grain for Grinding, of which the following is a specification:

It is well known that that portion of the meal of ground wheat termed "middlings" contains the whitest and most nutritious flour, and since modern improvements in the art of manufacturing flour have made it practicable to abstract this fine flour from the middlings, it has become of the highest importance to the miller to obtain the greatest possible amount of middlings from a given quantity of wheat. Now, that part of a berry of wheat which produces this middlings flour lies near to the hull thereof, and adheres thereto with great tenacity, so that an increase in the production of middlings flour from grain in its normal hard condition can only be attained by more violent grinding, i. e., "lower" milling; but this is necessarily also accompanied by a finer reduction of the hull, and a proportionate increase of "spec," which mixes inseparably with, and proportionately reduces the quality of, the flour.

The object of our invention is to provide a method and means for so preparing grain, more particularly wheat and rye, previous to grinding it into meal, that the hull of the berry will more readily separate, in grinding, from the flour-producing portions thereof, and that "higher" milling than is now ordinarily practiced will produce a maximum of middlings with a minimum of spec. To this end our invention consists in passing the grain through between a pair of rolls so set that they will not crush but merely roll the berries, to soften them, and to loosen their hulls. Screens are also combined with these rolls, arranged both above and below them, to subject the grain to thorough screening, both before it enters between and after it has passed through the rolls, to extract the cockle and other small foreign matters which may be mixed with it.

In the annexed drawings, Figure 1 is a perspective view of a machine adapted for practicing our invention. Fig. 2 is a vertical section thereof in a plane transverse to the axes of the rolls. Fig. 3 is a detail view, illustrating the manner of supporting the journals of the adjustable or yielding roll.

The same letters of reference are used in all the figures in the designation of identical parts.

The rolls A and B are mounted upon a substantial frame, C, the former, which is the driver, turning in fixed bearings, while the latter turns in sliding boxes D, moving in ways formed in the sills of the frame. The yielding roll B is held up to the unyielding roll A by the action of a weight, E, suspended from a horizontally-projecting arm, $F^1$, of a rock-bar, F, the vertically-projecting arms $F^2$ of which bear, respectively, against the rear ends of the boxes D. By adjusting the weight on the arm $F^2$ the yielding roll may be made to bear up to roll A with a greater or less pressure. The grain to be rolled is drawn from a hopper, G, by means of a feed-shaft, H, which is driven by pulleys and belt directly from the driving-roll A, so as to turn in unison therewith. From the hopper the grain passes onto an inclined sieve, I, intended to separate cockle and other small impurities, which, passing through the sieve, are received upon an apron, $I^1$, and discharged at the rear end of the machine. This sieve is at its upper and rear end suspended from hangers $I^2$, and at its forward and lower end, which delivers the grain upon the roll, it is provided upon either side with an arm, $I^3$, suitably bent to reach around the rims at the ends of roll A, and provided with laterally-projecting wings $i$, which rest upon the serrated rims $A'$ of the roll A. Thus, as roll A turns, a vibrating up-and-down motion is imparted to the sieve through the jolting action of the serrated rims $A'$ upon the arms $I^3$, not only sifting the grain, but also keeping the meshes of the sieve clean. The weight should be so arranged that the pressure of roll B on the grain will be just sufficient to gently roll it without crushing it. The effect of this will be a loosening of the hull, and a softening or an incipient powdering of the floury portions of the berry still confined within the hull. In treating very dry grain it will probably be found desirable to pass it several times through between the rolls, in order to produce the desired effect without crushing it. Grain thus treated should be ground quite "high." The hull will come off in large flakes with scarcely any floury particles adhering thereto, and the production of pure middlings will thus be largely increased. The rolled grain is received upon another sieve directly below the rolls, to undergo another screening for the separation of cockle, &c., that may possibly have passed over the tail of the upper sieve. This lower sieve, K, is at both ends suspended from links K', and is reciprocated by rod L' of the eccentric L, which is secured to the revolving shaft M driven through pulleys and belt from roll A.

It is proper to state that our process of loosening the hull of grain by rolling can be worked by means of mechanical contrivances different from the machine hereinbefore described. It might, for instance, be done by rolling the grain between flat surfaces. It will, therefore, be understood that our claim for the process does not depend upon the use of any particular machine.

The rolls may be finely rifled or fluted, but care must be taken to so construct them that they may under no circumstances crush the grain.

What we claim as our invention, and desire to secure by Letters Patent, is—

The herein-described process of loosening the hull of grain previous to grinding—that is to say, rolling the grain under pressure between hard surfaces without crushing it, so as to merely destroy the adhesion between the hull and the flour-producing portions of the berry immediately underlying it.

In testimony whereof we have signed our names to the foregoing specification in presence of two subscribing witnesses.

A. BERTELSEN.
M. MARTENS.

Witnesses for BERTELSEN:
C. M. PALMER,
A. S. DANIELS.
Witnesses for MARTENS:
JOSEPH CONNELL,
WM. W. WASHBURN.